United States Patent
Simon Bacardit

(10) Patent No.: US 7,159,953 B2
(45) Date of Patent: Jan. 9, 2007

(54) BRAKE SERVO UNIT COMPRISING A REACTION DISC DEVICE

(75) Inventor: Juan Simon Bacardit, Barcelone (ES)

(73) Assignee: Robert Bosch GmbH, Stuttgard (DE)

( * ) Notice: Subject to any disclaimer, the term of this patent is extended or adjusted under 35 U.S.C. 154(b) by 660 days.

(21) Appl. No.: 10/416,816

(22) PCT Filed: Nov. 13, 2001

(86) PCT No.: PCT/EP01/14204

§ 371 (c)(1),
(2), (4) Date: May 12, 2003

(87) PCT Pub. No.: WO02/40332

PCT Pub. Date: May 23, 2002

(65) Prior Publication Data

US 2004/0026198 A1 Feb. 12, 2004

(30) Foreign Application Priority Data

Nov. 15, 2000 (FR) .................................. 00 15299

(51) Int. Cl.
*B60T 8/34* (2006.01)
*F15B 9/10* (2006.01)
(52) U.S. Cl. .................................. 303/113.4; 91/369.2
(58) Field of Classification Search ............... 91/369.2; 303/113.4
See application file for complete search history.

(56) References Cited

U.S. PATENT DOCUMENTS

| | | | | |
|---|---|---|---|---|
| 4,069,742 A | * | 1/1978 | Gephart et al. ............ | 91/369.2 |
| 4,354,353 A | * | 10/1982 | Laue ............................ | 60/554 |
| 4,474,103 A | * | 10/1984 | Chamberlain et al. ..... | 91/369.2 |
| 4,494,443 A | * | 1/1985 | Tsubouchi ................. | 91/369.2 |
| 4,587,885 A | * | 5/1986 | Boehm et al. ............. | 91/369.2 |
| 4,643,075 A | * | 2/1987 | Wagner ...................... | 91/369.2 |
| 4,719,842 A | * | 1/1988 | Gautier ....................... | 91/369.2 |
| 4,862,787 A | * | 9/1989 | Suzuki et al. .............. | 91/369.2 |
| 4,984,506 A | * | 1/1991 | Perez ......................... | 91/369.2 |
| 5,054,370 A | * | 10/1991 | Osterday et al. .......... | 91/369.2 |
| 5,158,004 A | * | 10/1992 | Bauer ........................ | 91/369.2 |

(Continued)

*Primary Examiner*—Robert A. Siconolfi
(74) *Attorney, Agent, or Firm*—Leo H McCormick Jr; Sarah Taylor

(57) ABSTRACT

This invention mainly relates to a reaction-disk device, to its manufacturing process and to a pneumatic servomotor for an assisted braking, including such reaction device.

A reaction device according to the present invention comprises a receiving cavity, fitted with a reaction disk made of incompressible or substantially incompressible materials, comprising:
a) an applying surface for the plunger (or a similar member, connected to a member, actuated by the driver, such as the brake pedal, and advantageously connected to at least one element of the three-way valve of a pneumatic assistance servomotor);
b) an applying surface for the push rod (or a similar member for a force transmission to the master cylinder, more particularly a tandem master cylinder); and
c) a surface with a resilient response to the working pressures exerted on the reaction disk, so as to be elastically deformable on braking or, at the very least, during an emergency braking operation.

The present invention concerns, more particularly, the motor car industry.

And the present invention mainly applies to the design and manufacturing of braking systems.

3 Claims, 9 Drawing Sheets

U.S. PATENT DOCUMENTS

| | | | |
|---|---|---|---|
| 5,345,855 A * | 9/1994 | Uyama ..................... | 91/369.2 |
| 5,367,941 A * | 11/1994 | Gautier et al. ............ | 91/369.2 |
| 5,493,948 A * | 2/1996 | Gautier et al. ............ | 91/369.2 |
| 5,772,290 A * | 6/1998 | Heibel et al. ............ | 303/113.4 |
| 5,893,316 A * | 4/1999 | Inoue et al. ............... | 91/369.2 |
| 6,516,703 B1 * | 2/2003 | Stegmaier et al. ......... | 91/369.2 |
| 6,931,979 B1 * | 8/2005 | Bacardit et al. ........... | 91/369.2 |
| 7,032,496 B1 * | 4/2006 | Schramm et al. .......... | 91/369.2 |
| 2003/0056642 A1 * | 3/2003 | Kobayashi ................. | 91/369.2 |
| 2005/0166748 A1 * | 8/2005 | Schramm et al. ......... | 91/376 R |
| 2006/0070519 A1 * | 4/2006 | Bacardit .................... | 91/369.2 |

\* cited by examiner

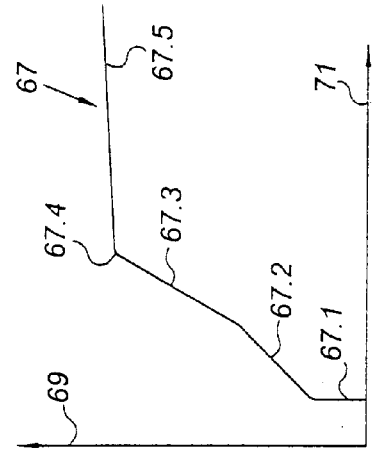
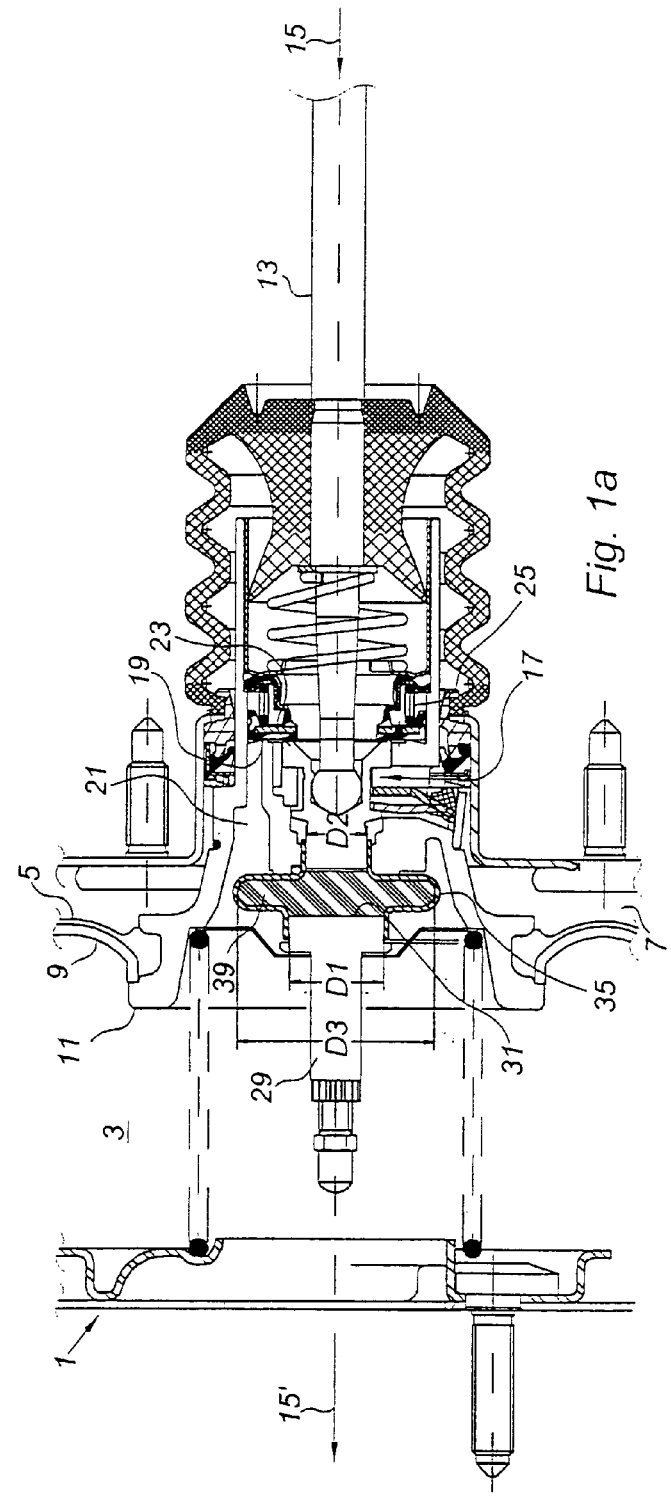
Fig. 1b
Fig. 1a

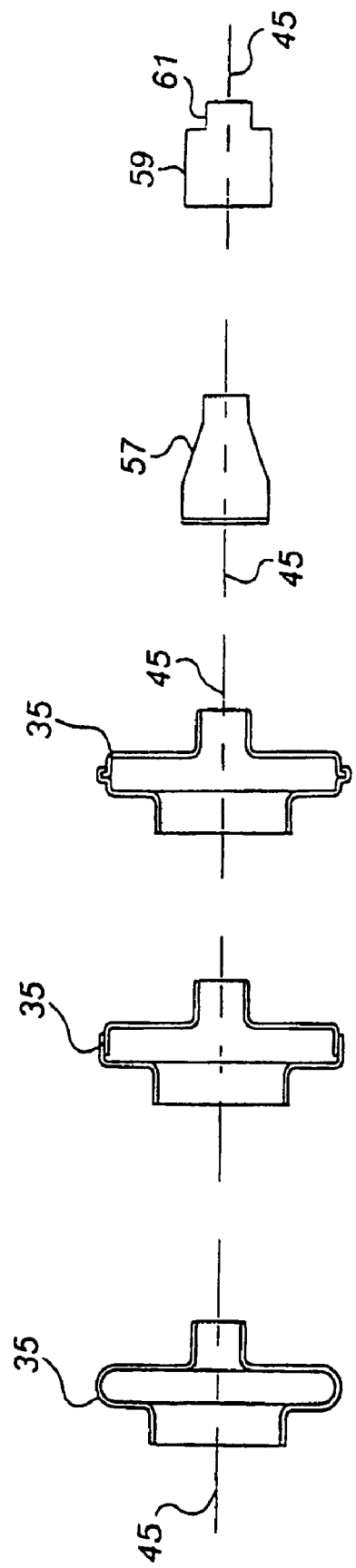

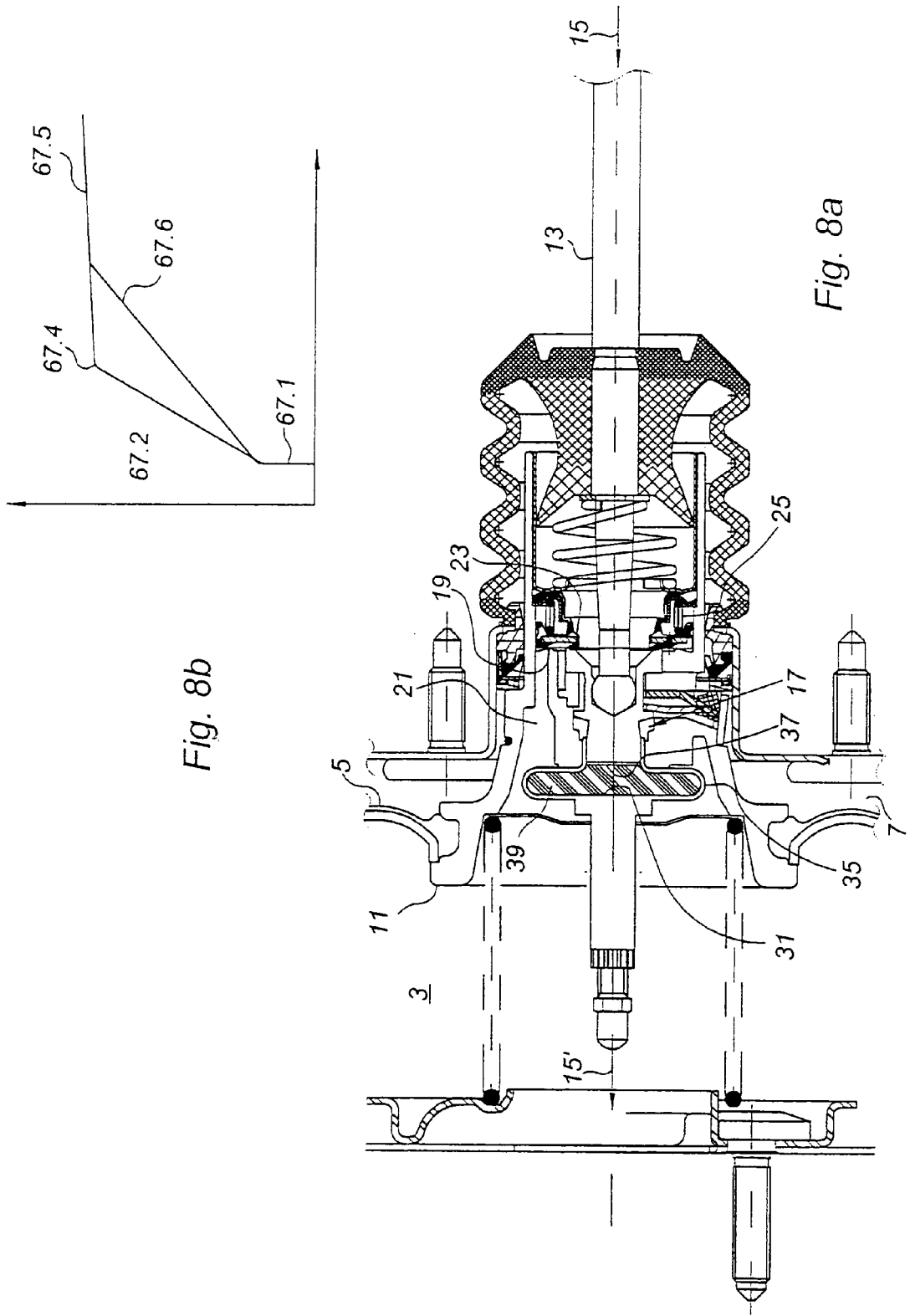

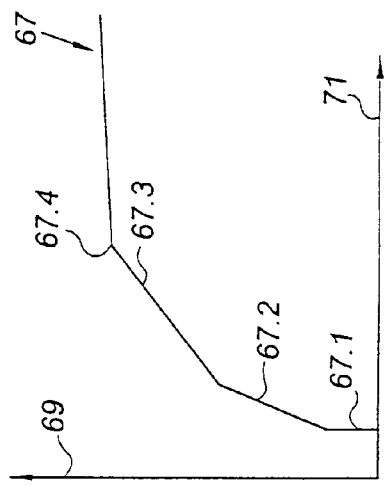
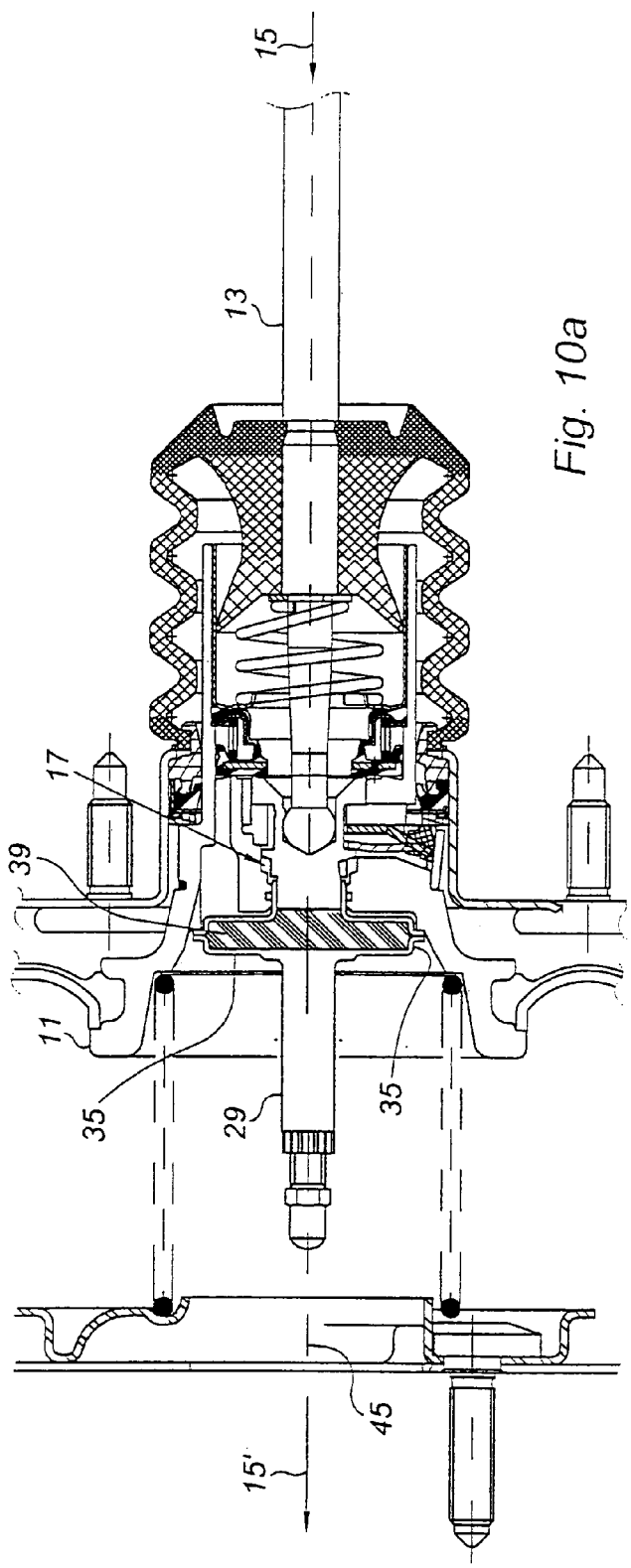

BRAKE SERVO UNIT COMPRISING A REACTION DISC DEVICE

This invention mainly relates to a reaction-disk device, to its manufacturing process and to a pneumatic servomotor for an assisted braking, including such reaction device.

Quite usually, a pneumatic servomotor for an assisted braking comprises an incompressible reaction disk, arranged in a receiving cavity, a first wall of which is part of a plunger, driven by a brake pedal, whereas its second wall, opposite the first one, belongs to a push rod. In a well-known manner, the assistance ratio of the output forces to the input forces of a pneumatic servomotor for an assisted braking depends on the application surface of the push rod, and the elements which may be rigidly locked with said push rod, onto the reaction disk in relation to the application surface of the plunger, and the elements which may be rigidly locked with said plunger, onto the reaction disk.

At the actual working pressures, the deformations of the walls of the receiving cavity for the reaction disk are negligible.

Besides, it may be desired that the assistance ratio be made to vary so as to avoid an abrupt transition as regards the saturation of the servomotor for an assisted braking (minimum pressure in the chamber connected to a vacuum source and maximum pressure in the other chamber, typically the atmospheric pressure) or, just the opposite, in order to improve the efficiency of an emergency braking operation.

FR 2 691691 explains how to arrange, within the receiving cavity for the reaction disk, a piece which can deform above given exerted forces, thus enabling, beyond said threshold, a washer to be rigidly locked with the plunger for the assistance ratio to vary.

Moreover, it is difficult to adjust the assistance ratio, as determined by the geometry of the receiving cavity for the reaction disk, to the value(s), which is/are considered optimal by the car manufacturer, depending on the technical specifications of the vehicle to be equipped, as well as on situations, which the driver may happen to be confronted with (emergency braking, normal braking, keeping the vehicle at a stop). Besides, there is not much available room for the disk-receiving cavity of the prior type, which means that the extreme values of the assistance ratio, likely to be obtained, are somewhat limited.

Therefore, it is an object of the present invention to provide a reaction device for the achievement of the optimized assistance ratio(s) as a function of the situations, which the driver may have to cope with.

Another object of this invention consists in providing a modular reaction device making it possible, at the designing stage for a new vehicle, to modify the assistance ratio as a function of the characteristics of such vehicle and/or according to the car manufacturer's requirements.

It is also an object of the present invention to provide such a reaction device for a wider range of available assistance ratios.

It is another object of this invention to provide a reaction device for an optimization of the operation of the pneumatic assistance servomotor and, more particularly, of the three-way valve taking charge, on braking, of the tight separation of the front and rear chambers of the servomotor, as well as of the pressure-fluid supply, typically atmospheric-pressure air, of one of said chambers of the pneumatic servomotor for an assisted braking.

Still another object of this invention consists in providing such a reaction device, having an improved efficiency.

It is also an object of the present invention to provide a reaction device, which is specially compact.

It is another object of this invention to provide such a reaction device having but a low cost price.

Well, the Applicant has discovered that, surprisingly enough, it would be advantageous to use a receiving cavity for the reaction disk, which is elastically deformable under the service pressures.

These objects are achieved, in accordance with this invention, by a reaction device, comprising a receiving cavity, fitted with a reaction disk made of incompressible or substantially incompressible materials, comprising:

a) an applying surface for the plunger (or a similar member, connected to a member, actuated by the driver, such as the brake pedal, and advantageously connected to at least one element of the three-way valve of a pneumatic assistance servomotor);

b) an applying surface for the push rod (or a similar member for a force transmission to the master cylinder, more particularly a tandem master cylinder); and c) a surface with a resilient response to the working pressures exerted on the reaction disk, so as to the elastically deformable on braking or, at the very least, during an emergency braking operation.

The main subject of this invention is a reaction device intended for a servomotor for an assisted braking, comprising a substantially incompressible reaction disk, and a receiving housing for said reaction disk, first means for a force application to said reaction disk and driven by a brake pedal, second means for a force application to said reaction disk and connected to a push rod, and third means for a force application to said reaction disk and driven by motive means generating a braking assistance force, characterised in that said housing of said reaction disk comprises a cap, capable of being elastically deformed when forces are applied by said first force-applying means.

According to another aspect of the invention, the elastically-deformable cap is prestressed so as to exert a constrictive force on the reaction disk when no forces are applied by said first force-applying means.

Another subject matter still of the present invention is a reaction device, characterised in that said device carries out a modification of the assistance ratio as a function of the value of the force, which is applied by said first force-applying means.

According to another aspect of the invention, said reaction device is characterised in that it carries out an increase in the assistance ratio beyond the threshold of a force exerted by said first force-applying means.

Another subject of the invention is a reaction device, characterised in that the deformable cap is integral with a push rod.

The present invention also deals with a reaction device, characterised in that the elastically-deformable cap comprises a first cylindrical or substantially cylindrical inlet having a first diameter D1, for the accommodation of an end of the push rod, a second cylindrical or substantially cylindrical inlet having a diameter D2, for the accommodation of an end of a distributor plunger constituting said first force-applying means, and in that, between said first and second inlets, the deformable cap has an inner diameter D3, where D3>D1>D2.

Another subject matter still of the present invention is a reaction device, characterised in that, when a force is applied by said first means, the elastic deformation of the cap causes the bearing means of the cap to rest on a bearing area integral with an element belonging to the assembly, comprising said first force-applying means, said second force-applying means and said third force-applying means.

Another subject matter still of the present invention is a reaction device, characterised in that the bearing area is mechanically connected to said second force-applying means.

According to another aspect of the invention, said reaction device is characterised in that said deformation of the resilient cap, causing the bearing means of the cap to bear on a bearing area, is an axial deformation.

The present invention also deals with a pneumatic assistance servomotor, comprising a pneumatic piston driven by a pressure difference between a first chamber and a second chamber, characterised in that it comprises a reaction device and in that said third force-applying means are mechanically connected to a pneumatic piston of the servomotor.

Another subject matter of the invention is a manufacturing process for a reaction device, characterised in that it comprises the successive steps of:
a) manufacturing a deformable cap (35);
b) filling, at least in part, the cap (35) according to step a) with an elastomer;
c) vulcanizing the elastomer within the cap, following the filling operation in step b).

In a first embodiment, the resilient wall of the receiving cavity for the reaction disk is not prestressed, which means that, at rest, it exerts no appreciable constrictive force on the reaction disk. In a second variant, the resilient wall of the receiving cavity for the reaction disk is prestressed, which means that, at rest, it exerts a constrictive force on the reaction disk.

The deformation of the resilient wall brings about a change in the response curve of the output forces, dependingly on the input forces, so as to modify the assistance ratio.

Besides, thanks to the elastic deformation, the wall of the receiving cavity for the reaction disk may come into contact with a bearing element for the force transmission, e.g. to the push rod, to a pneumatic piston driven by the pressure difference between both chambers of the servomotor, and/or to the plunger.

Other features and advantages of the present invention will be apparent from the following detailed description, by way of example and by no means as a limitation, when taken in conjunction with the accompanying drawings, in which:

FIG. 1a is a partial longitudinal sectional view of a first embodiment of a pneumatic servomotor for an assisted braking according to the present invention;

FIG. 1b is a curve illustrating the output forces as a function of the input forces of the device shown in FIG. 1a;

FIG. 3 is a longitudinal sectional view of the preferred embodiment of the receiving cavity for the reaction disk;

FIG. 4 is a longitudinal sectional view of a second embodiment of the receiving cavity for the reaction disk;

FIG. 5 is a longitudinal sectional view of a third embodiment of the receiving cavity for the reaction disk;

FIG. 6 is a longitudinal sectional view of a fourth embodiment of the receiving cavity for the reaction disk;

FIG. 7 is a longitudinal sectional view of a fifth embodiment of the receiving cavity for the reaction disk;

FIG. 8a is a partial longitudinal sectional view of a second embodiment of a pneumatic servomotor for an assisted braking according to the present invention;

FIG. 8b is a curve illustrating the output forces as a function of the input forces of the device shown in FIG. 8a;

FIG. 9b is a curve illustrating the output forces as a function of the input forces of the device shown in FIG. 9a;

FIG. 10a is a partial longitudinal sectional view of a fourth embodiment of a pneumatic servomotor for an assisted braking according to the present invention;

FIG. 10b is a curve illustrating the output forces as a function of the input forces of the device shown in FIG. 10a;

Figure 1C:
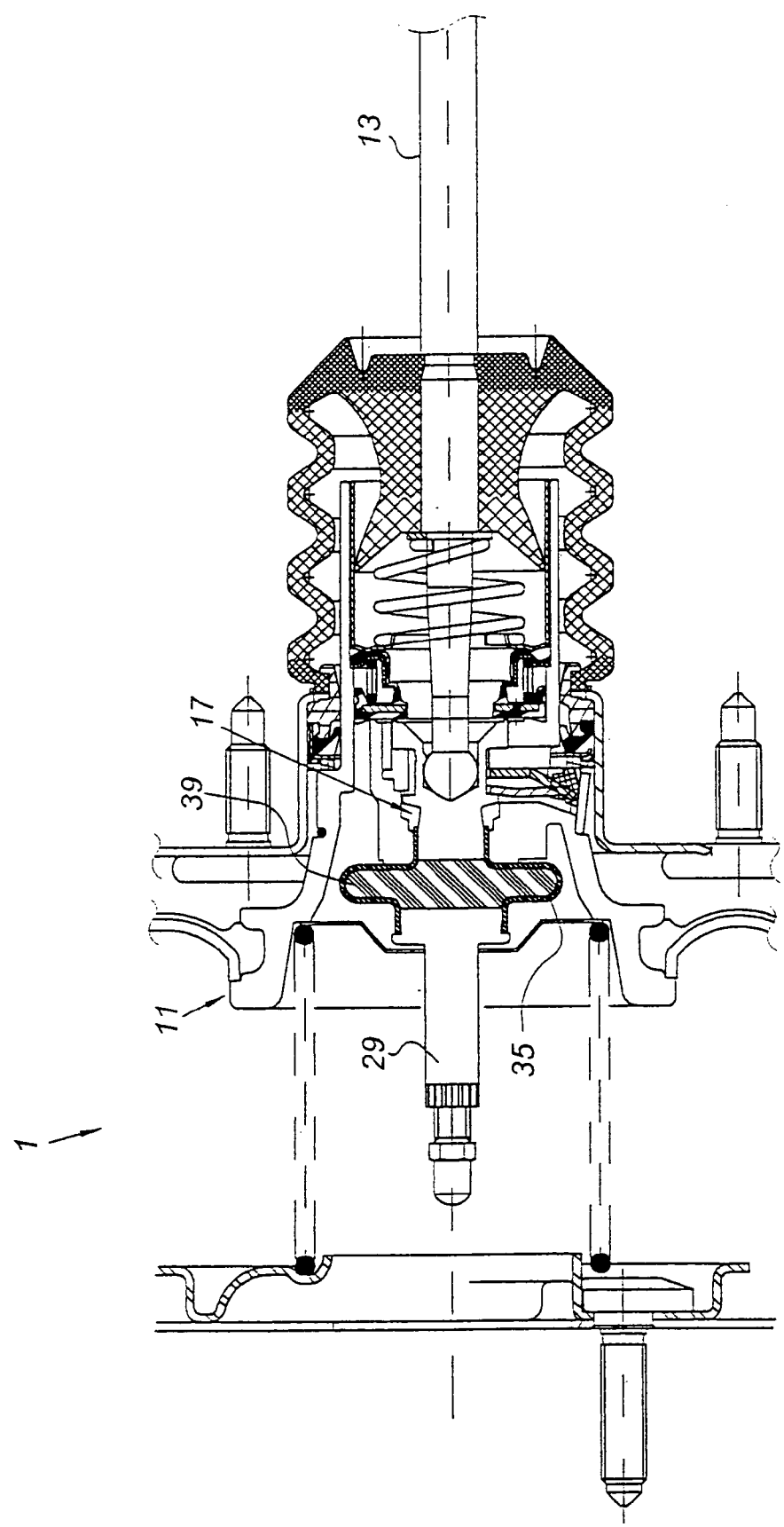
FIG. 1c is a longitudinal sectional view of the device shown in FIG. 1a, in the configuration corresponding to an emergency braking.
Figure 2:
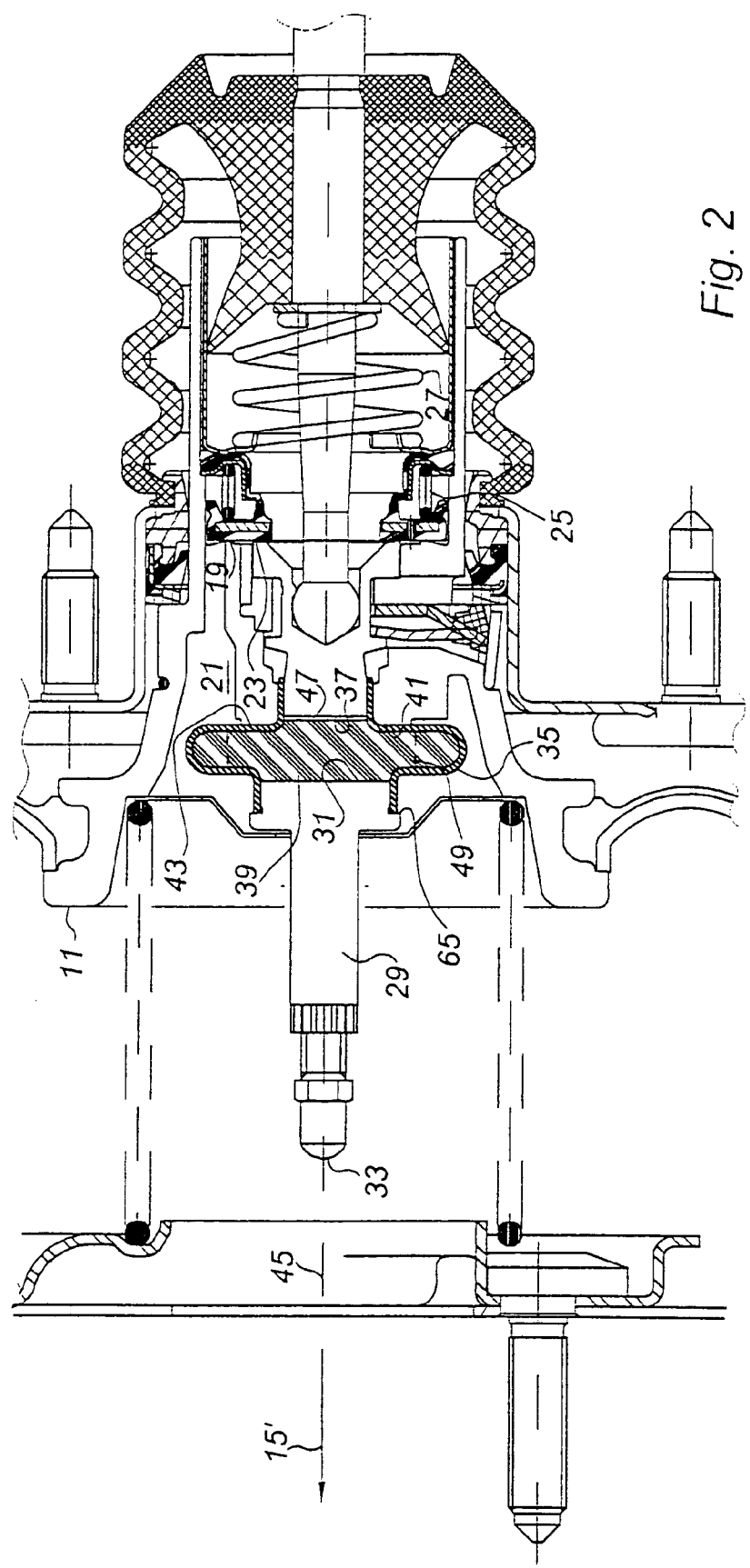
FIG. 2 is a longitudinal sectional view, on a larger scale, showing the details of a reaction device according to the present invention.

In FIGS. 1 through 12, the same reference numerals will designate the same elements.

FIGS. 1a, 1c, 8a, 9a, 10a, 11 and 12 show a pneumatic servomotor 1 for an assisted braking, comprising a front chamber 3, separated from a rear chamber 7 by a tight diaphragm 5. The diaphragm 5 rests on a rigid skirt 9, driving a pneumatic piston 11 at the time of the volume variation of said chambers. A control rod 13, capable of being driven in the direction of the arrow 15 by a brake pedal (not shown), bears on a distributor plunger 17. This distributor plunger 17 controls a three-way valve fitted with a first radially-outer flap 19 shutting off, on actuation, a passage 21 connecting the front chamber 3 with the rear chamber 7 of the servomotor 1, and a second radially-inner flap 23 opening, on actuation, the air-supply passage of the rear chamber 7 of said servomotor. The valve further comprises a return spring 25 for the flap and a spring 27, closing the valve when the brake is not actuated. The pneumatic piston 11 drives, in the direction of the arrow 15', a push rod 29 bearing on a primary piston of a tandem master cylinder (not shown).

The mode of operation of such servomotor will now be described.

When the system is at rest, the seats of the flaps 19 and 23 are axially offset in such a way that the forward travel of the control rod 13 in the direction of the arrow 15, in the first place, closes the flap 19 and then opens the flap 23. For a given position of the control rod 13, the flap 23 opens and closes periodically in order to set the push rod 29 in the desired position and, as a result, the desired pressure in the hydraulic circuit of the braking system.

At rest, the flap 19 is permanently open whereas the flap 23 is permanently closed. Thus, the same low pressure exists in the front chamber 3 and in the rear chamber 7.

When the driver depresses the brake pedal, the control rod 13 moves forward and drives the distributor plunger 17, thus closing the flap 19 and opening the flap 23. The atmospheric-pressure air rushes into the rear chamber 7. The pressure difference drives the skirt 9 which, in turn, moves the pneumatic piston 11 forward.

The end 31 of the push rod 29, in the opposite direction to the end 33 facing the tandem master cylinder, constitutes together with a cap 35, which acts resiliently under the working pressures, and with the front face 37 of the distributor plunger 17, a receiving housing for a reaction disk 39, made of an almost incompressible material (typically an elastomer, e.g. NBR or EBDM, preferably having a hardness in the range from 50 SHORE A to 70 SHORE A). Elastomers exhibiting a lower hardness have a behaviour resembling further that of a perfect fluid, but at the cost of a reduced fatigue strength (a shorter service life). Thus, a harder rubber grade makes it possible to increase the assistance ratio while reducing the intensity of the reaction force, experienced by the driver as he depresses the brake pedal on a braking operation. Yet such an increase in the reaction disk hardness results in that the point of inflexion of the assistance ratio is raised as well. In an advantageous manner, the cap 35 consists of a resilient material, such as sheet steel, e.g. a spring steel sheet. By way of example, the cap 35 is made of a steel sheet with a thickness ranging from 0.1 to 5 mm, preferably from 0.3 to 3 mm, and still better ranging from 0.5 to 1.5 mm, e.g. a thickness equal to 1 mm. As a variant, a cap with a variable thickness is used in order to obtain balanced stress values in the working phase. Advantageously, the inner diameter D3 of the cap 35 is greater that the diameter D2 of the face 37 of the distributor plunger 17 (and of the corresponding inlet of the cap 35), itself greater that the diameter D1 of the face 31 of the push rod 29 (and of the corresponding inlet of the cap 35). The reaction disk 39 is entirely accommodated inside the cap 35. In an advantageous manner, in the absence of input forces, the cap 35 keeps the reaction disk 39 in position.

Advantageously too, the front face 41 of the central part of the pneumatic piston 11 bears on the outer rear face 43 of the cap 35. In the represented advantageous embodiment, the faces 41, 37 and 31 form planes perpendicular to an axis 45 of the servomotor 1 according to the present invention. The face 31, on the one hand, and the faces 37 and 41 on the other hand are situated opposite each other on either side of the reaction disk 39. In this embodiment, the front face 41 of the piston 11 is radially outer in relation to the front face 37 of the distributor plunger 17. In the illustrated advantageous embodiment, the reaction disk 39 entirely fills its receiving housing, with the exception of a gap 47, remaining between the rear face of the reaction disk 39 and the front face 37 of the distributor plunger 17.

The cap 35 exerts, on the reaction disk 39, forces which are symbolized by the arrows 49 and which depend on the rigidity of the shell 35, said rigidity itself being dependent upon the thickness of the shell 35 and the properties of the selected material as well as upon any prestress exerted on such cap. Thanks to these parameters, it is possible to modify the assistance ratio as a function of the forces which the distributor plunger 17 exerts.

Likewise, various cap shapes may result in different resiliencies. Thus, FIGS. 1a, 1c, 2 and 3 show a revolution one-piece cap 35 for the accommodation of a reaction disk 39, such cap comprising a central area with a diameter D3 greater than that of a front inlet (D1 so as to insert the rear end 31 of the push rod 29, itself being greater than the diameter D2 of the rear inlet receiving the front face 37 of the distributor plunger 17). In the case on a one-piece cap, in an advantageous manner, the cap is filled with a noncured elastomer and the vulcanizing operation is carried out in situ, i.e. inside the cap. The cap according to FIG. 11 further comprises a radially-outer bulge 51 contributing to the radial deformability of the cap 35. The cap according to FIG. 12 exhibits a radially-outer corrugation, comprised of crests 53 with at least one hollow 55 in-between so as to improve the axial compliance of the cap. FIG. 6 shows a cap 35 in which a tapered transition 57 is provided between the cylindrical inlet and outlet. The cap 35 according to FIG. 7 comprises a first cylinder 59 with a diameter D1, constituting the receiving housing for the reaction disk 39 and for the end 31 of the push rod 29, such cylinder 59 being connected with a second cylinder 61, having a diameter D2 and situated in prolongation of the former with the same axis 45. The second cylinder 61 constitutes the inlet for the accommodation of the front face 37 of the distributor plunger 17. In the examples according to FIGS. 8a and 9a, the cap 35 is integral with the push rod 29, while providing an inlet for the front face 37 of the distributor plunger 17. In the same way, caps 35, which are integral with the distributor plunger 17 and comprise an inlet for the rear end 31 of the push rod 29, do not depart from the scope of this invention.

As a matter of fact, the present invention is by no means restricted to the implementation of one-piece caps 35, quite the contrary it also embraces caps consisting of several parts, which are joined e.g. by welding (as shown in FIG. 4) or by crimping (as illustrated in FIG. 5). Advantageously, each cap 35 comprises two parts, assembled at the greatest-diameter area of the cap. Thanks to the implementation of caps having a plurality of assembled parts, a reaction disk 39, which has been previously cured, can be fitted within the cap.

In the illustrated preferred embodiments, the caps 35 exhibit a revolution form about the axis 45. Yet the use of other cap shapes does not depart from the scope of this invention. Likewise, the inlets of a cap are not necessarily coaxial, neither are they necessarily facing one another. The adequacy of the cap shape (contour, thickness) for a given material, to the required behaviour and resiliency (rigidity) may be checked, e.g. using a finite-element calculation method.

In the same way, caps comprising hinged elements and resilient return elements, such as springs, clips, etc., do not depart either from the scope of the present invention.

FIG. 1a shows the pneumatic servomotor 1 for an assisted braking according to the invention, which comprises a reaction device fitted with a deformable cap 35 capable of assuming two different configurations, depending on the forces which are axially applied (i.e. along the axis 45) to the brake pedal, and transmitted through the control rod 13 and the distributor plunger 17 to the reaction disk 39, as well as through the pneumatic piston 11, and more particularly its face 41, to the cap 35. In the first aspect, as shown, the front end 37 of the distributor plunger 17 as well as the rear end 31 of the push rod 29 may slide freely within their respective inlets (cylindrical, in the illustrated example) provided in the cap 35. The shell of the cap 35 takes charge of the containment and/or constriction of the reaction disk 39. Above a threshold value as concerns the force applied to the cap 35, a shortening of its axial length takes place, owing to an elastic deformation, and the front end 63 of the cap 35 comes to rest on bearing means 65, integral with the push rod 29. In the illustrated advantageous embodiment, such means 65 consist of a shoulder having a greater diameter than the diameter of the end 31 of the push rod 29. In other words, the elastic deformation of the cap 35 suppresses an axial clearance h, enabling the cap 35 to bear on the push rod 29. Thus, in this embodiment and when the cap assumes its second configuration, because the force exceeds the predetermined threshold value, the applying surface of the push rod 29 is no longer proportional to the square of the diameter D1 of the end 31 of the push rod 29, but instead proportional to the square of the diameter D3, which is the inner diameter of the widest area of the cap 35. However, the present invention is by no means restricted to the suppression of an axial clearance h, as a matter of fact it encompasses contacting motions owing to a radial deformation or similar.

FIG. 1b shows the performance of the servomotor 1 according to the present invention, as represented in FIG. 1a. FIG. 1b is a curve 67 showing the output force 69 as a function of the input force 71.

The slope of the curve 67 corresponds to the assistance ratio of the pneumatic servomotor for an assisted braking.

In a first section 67.1, the curve 67 runs parallel with the axis of the output forces 69, corresponding to the initial jump.

The section 67.1 connects with a section 67.2 having a first slope p1. The section 67.2 corresponds to a normal braking action, the so-called "comfort braking".

The section 67.2 is followed by a section 67.3 of the curve 67, having a second slope p2 greater than p1. The section 67.3 corresponds to a strong braking action, the so-called "emergency braking". The increased assistance ratio in an emergency braking operation results in an improved safety of the vehicle. As a matter of fact, in an emergency braking situation, either less force has to be applied to the brake pedal, for the same stopping distance, or the stopping distance is reduced for a given force. Besides, as regards motor vehicles equipped with antiblocking systems (ABS), the vehicle wheels do not risk being blocked because of the improved braking efficiency, when the driver depresses the pedal.

At point 67.4, the section 67.3 connects with the section 67.5, in which the servomotor 1 is saturated, which means that, e.g., the rear chamber is connected to the atmospheric pressure. In the section 67.5, the increase in the output force corresponds to the muscular energy applied by the driver to the brake pedal.

The servomotor 1 according to FIG. 1a is shown in FIG. 1c in an emergency braking situation, after the suppression of the clearance h.

FIG. 8a shows an embodiment of the servomotor 1 according to the present invention, in which the cap 35 is integral with the push rod 29. It follows therefrom that the device has one configuration only (no suppression of the clearance h, and variable contacting motion depending on the input force). It results in that the curve 67 has but one section 67.2, directly connecting the jump section 67.1 with the saturation point 67.4 of the pneumatic assistance servomotor. In other words, the assistance ratio is constant from the jump up to the saturation of the servomotor 1 according to this invention. Nevertheless, the slope p1 of the section 67.2 and, in consequence of it, the assistance ratio of the servomotor according to FIG. 8a are greater than those shown in FIG. 8b, at 67.6, for a servomotor of a known type, the distributor plunger 17 of which has the same diameter D2.

Figure 9A:
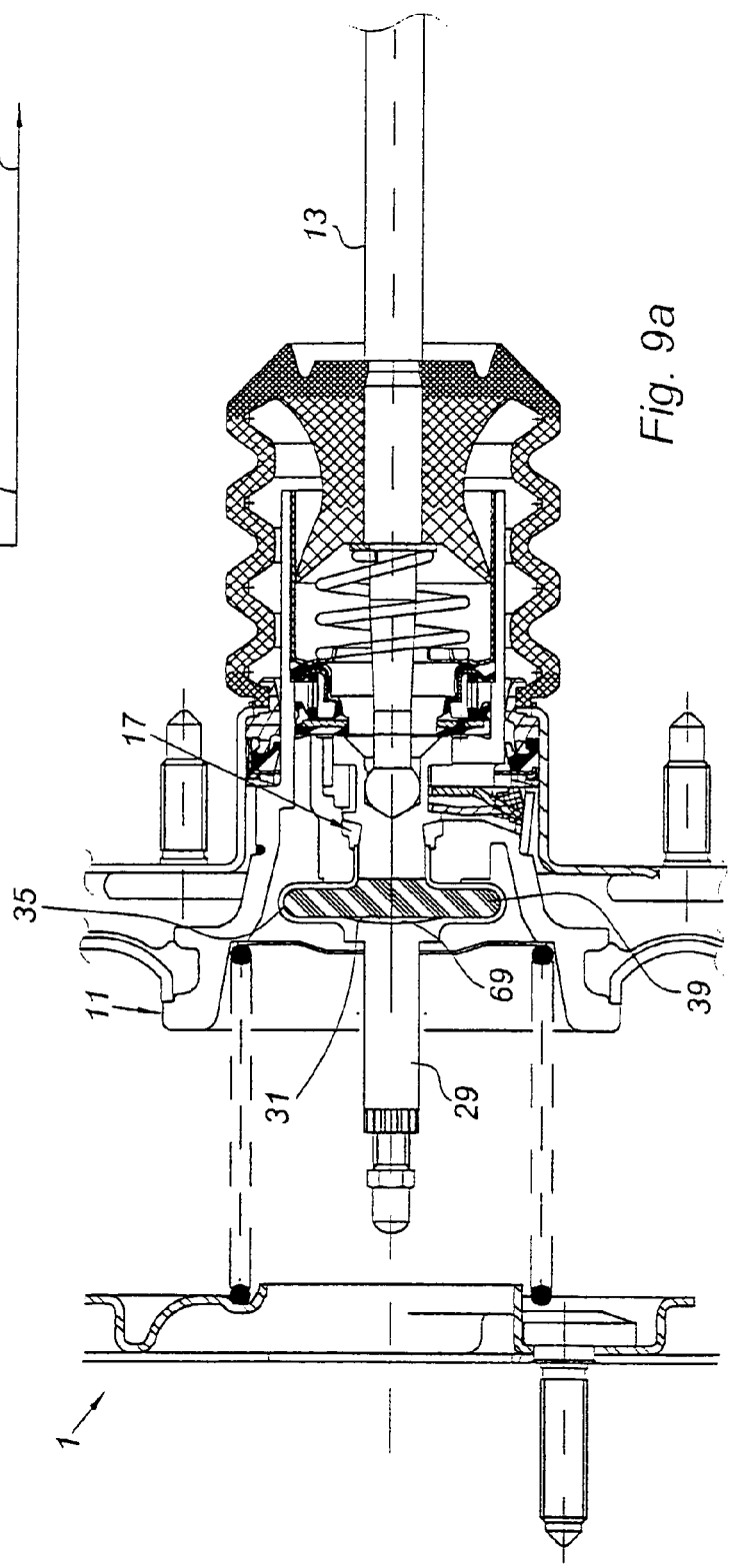
FIG. 9a is a partial longitudinal sectional view of a third embodiment of a pneumatic servomotor for an assisted braking according to the present invention.
Figure 9B:
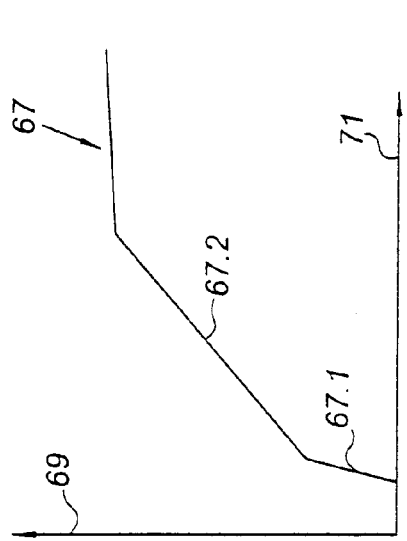
Figure 11:
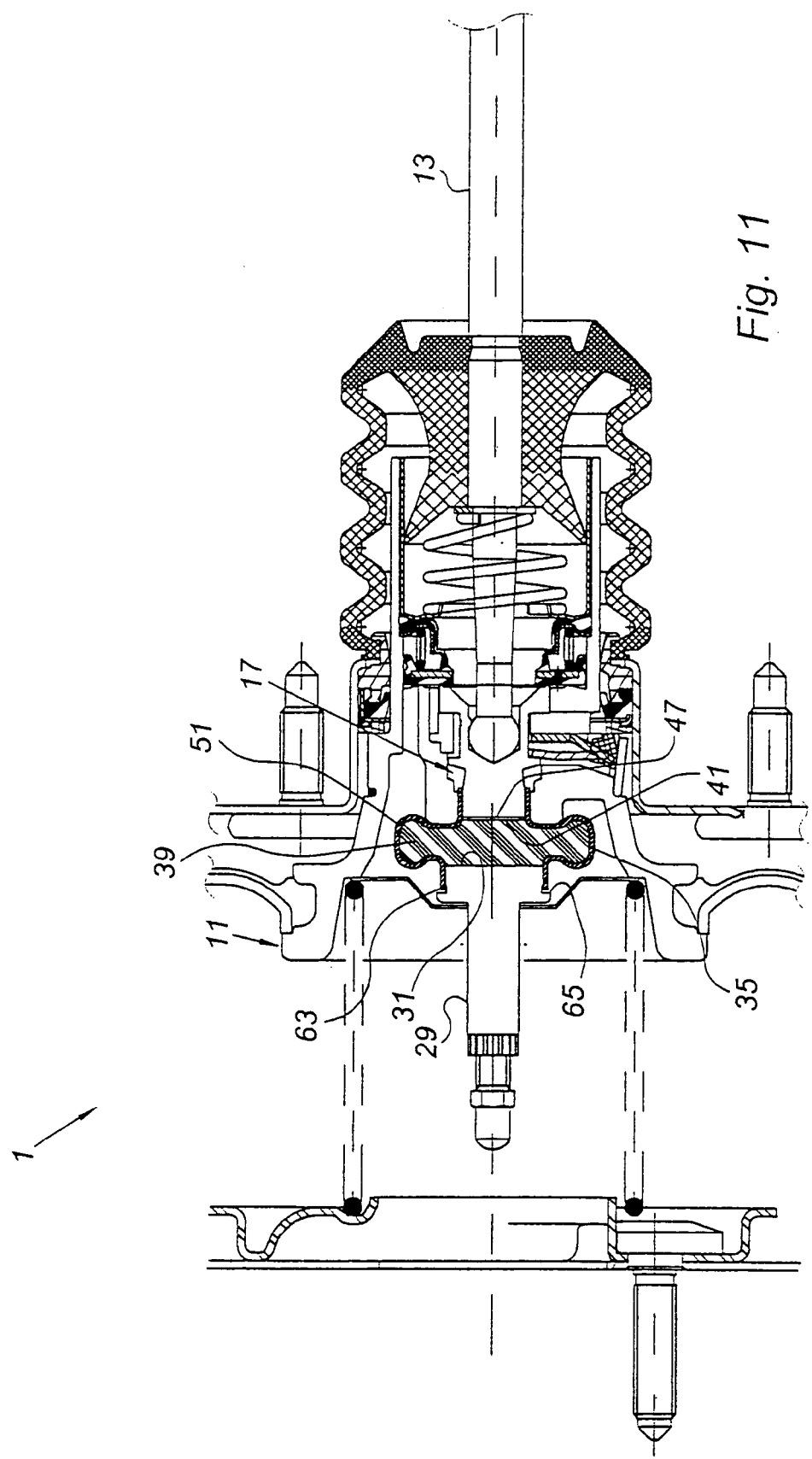
FIG. 11 is a partial longitudinal sectional view of a fifth embodiment of a pneumatic servomotor for an assisted braking according to the present invention.
Figure 12:
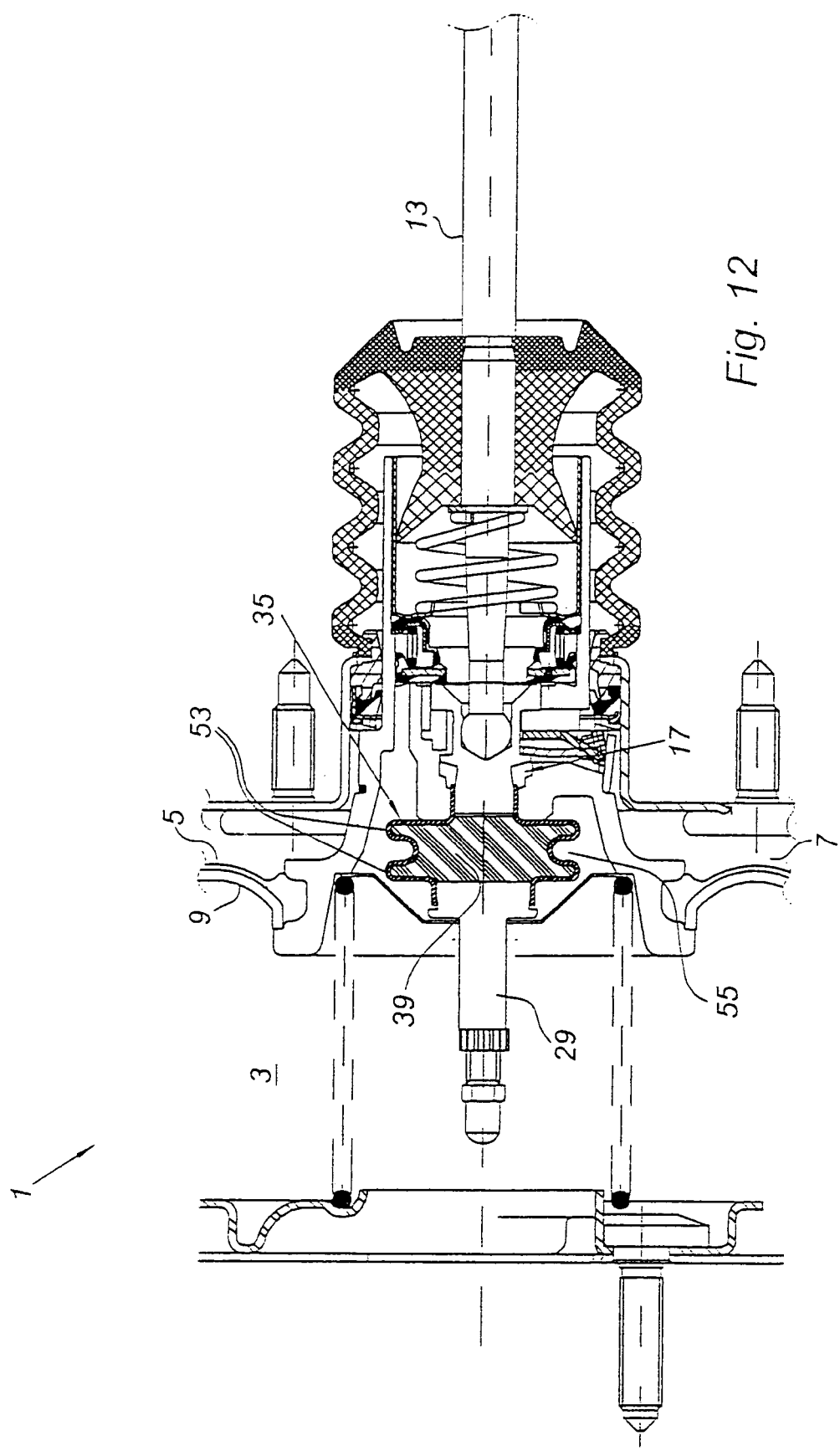
FIG. 12 is a partial longitudinal sectional view of a sixth embodiment of a pneumatic servomotor for an assisted braking according to the present invention.

FIG. 9a illustrates a servomotor 1 according to the present invention, which differs from that shown in FIG. 8a, in that the rear end 31 of the push rod 29 comprises a cavity 69, providing some room between the reaction disk 39 and said end 31. As shown in FIG. 9b, before a force is applied but when the end 37 of the distributor plunger rests on the disk (no more gap 47), thanks to the gap 69 on the push rod side, the jump section 67.1 may exhibit a gentle slope, which means a better operating stability for the three-way valve including the flaps 19 and 23. In other words, the front chamber and the rear chamber of the servomotor are prevented from communicating with each other again in an undesired manner, at the beginning of the braking operation, when the functional clearances are being taken up (before the tandem master cylinder makes resistance to the forward travel of the pneumatic piston 11).

It should be clearly understood that the present invention is by no means limited to a cap 35 bearing on the push rod 29: as a matter of fact, it also applies to caps 35 bearing, after a deformation, on the distributor plunger 17, on the pneumatic piston 11 and/or on the push rod 29. In the example according to FIG. 10a, the cap is permanently rigidly locked with the push rod 29, while its deformation beyond a given threshold of the input force suppresses a clearance h on the finger side. As shown in FIG. 10b, it results in that the slope p2 of the section 67.3 is gentler than the slope p1 of the section 67.2, thus avoiding too abrupt a transition at point 67.4, i.e. the saturation of the pneumatic assistance servomotor.

Moreover, the combination of the features and teachings according to the drawings does not depart from the scope of the present invention. For instance, the gap 69 may be provided in the device shown in FIG. 1a, 11 or 12 without departing either from the scope of this invention.

Likewise, it is to be understood that the reaction device in accordance with the present invention is in no way restricted to an installation in a pneumatic servomotor for an assisted braking, it is also applicable to any device whatever implementing a reaction device.

The present invention concerns, more particularly, the motor car industry.

And the present invention mainly applies to the design and manufacturing of braking systems.

The invention claimed is:

1. A reaction device for use in a servomotor for an assisted braking, comprising a substantially incompressible reaction disk and a housing for receiving said reaction disk, first means driven by a brake pedal to initiate a brake application, second means including an output push rod with a head thereon for applying a reaction force application to said reaction disk, said output push rod having an annular bearing surface thereon and third means including a pneumatic piston driven motive means for generating a braking assistance force that is applying through said reaction disk to output push rod to effect a brake application, characterised in that said housing for receiving said reaction disk comprises an elastically deformed cap defined by a first cylindrical inlet having a first diameter D1 for receiving a first end on a input push rod of said first means such that a first gap is present between said first end and the reaction disk, a second cylindrical inlet having a second diameter D2 for receiving an second end on an output distributor plunger that constitutes said first force-applying means such that a second gap is present between said annular bearing surface and a face on the second diameter and a third diameter D3 located between said first and second inlets with D3>D1>D2, said input push rod responding to an actuation force by moving to close said first gap and bring said first end into engagement with said reaction disk activating a valve to develop an operational force for said motive means, said operational force being applied to said cap to initially directly move said output push rod by acting through the reaction disk until a reaction force compresses said reaction disk causing said cap to deform and allow said face on said second diameter to engage said bearing surface on said output push rod and close said second gap such that a ratio of input force to output force is a function of the ratio of D2 and D1 to each other and to D3.

2. The reaction device according to claim 1, characterised in that the elastically-deformable cap is prestressed so as to exert a constrictive force on the reaction disk when no forces are applied by said first force-applying means.

3. Reaction device according to claim 1, characterised in that the bearing surface is mechanically connected to said second force-applying means.

* * * * *